Oct. 11, 1932.  W. H. NASH  1,881,864
HANDLE SECURING MEANS FOR BASKETS AND THE LIKE
Filed May 22, 1931
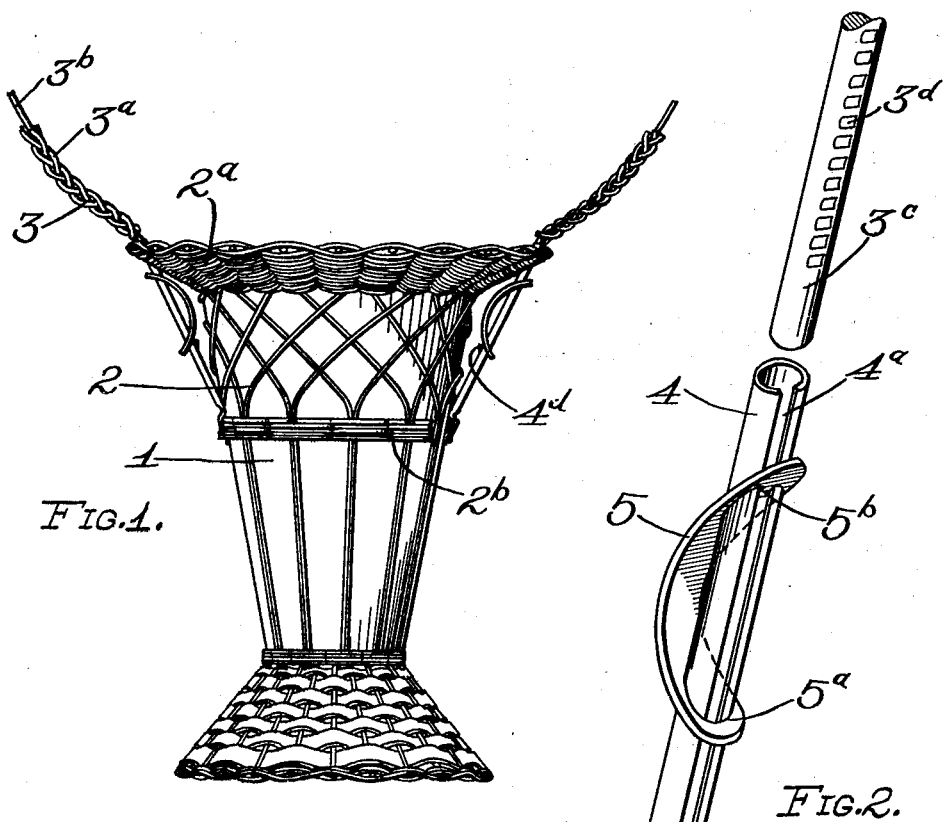
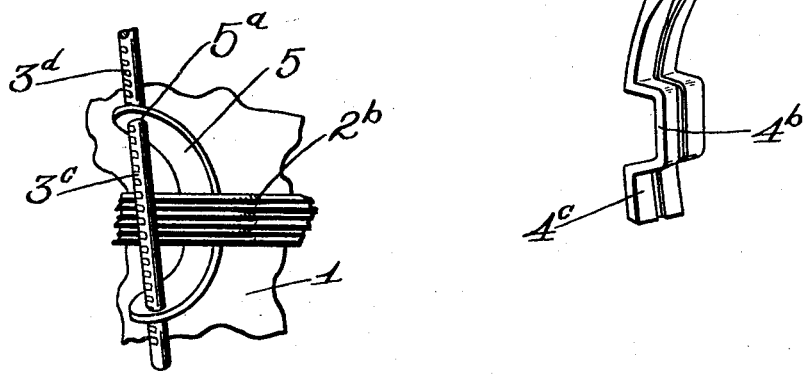
INVENTOR
WALTER H. NASH
BY A. B. Bowman
ATTORNEY Patented Oct. 11, 1932

1,881,864

UNITED STATES PATENT OFFICE

WALTER H. NASH, OF ARLINGTON, CALIFORNIA

HANDLE SECURING MEANS FOR BASKETS AND THE LIKE

Application filed May 22, 1931. Serial No. 539,243.

My invention relates to means for securing handles to baskets and the like.

The objects of this invention are: first, to provide means of this class whereby handles or other similar devices may be easily, quickly and positively secured to baskets or other devices, and secured thereto in such a manner that the handle or other device may be easily and quickly detached for replacing the handle or other device, or to provide economy in shipping or transporting or storing the complete article; second, to provide means of this class which may be operated or by which the handle or other device may be connected or disconnected without the use of tools; third, to provide means of this class whereby the handle or other device is secured in position by merely inserting the end of the handle or other device into the holding or securing means, but which prevents the ready removal of the handle or other device until the latter is manually released by the means; fourth, to provide novel and simple combined resilient and positive handle engaging means for retaining the handle or other device in position; fifth, to provide a novel handle guide and positioning means in the form of tubes secured at the sides of baskets and the like for readily locating the ends of a bowed handle when desiring to secure the same to the basket, the guide and positioning means having means in connection therewith for positively gripping the ends of the handle when said ends are inserted into said guide and positioning means; sixth, to provide as a whole a novelty constructed handle securing means for baskets and the like; and, seventh, to provide means of this class which is very simple and economical of construction, durable but yet flexible, and such means which will not readily deteriorate or get out of order.

With these and other objects in view, as will appear hereinafter, I have devised a handle securing means having certain novel features of construction, combination and arrangement of parts and portions for baskets and the like, as will be hereinafter described in detail and particularly set forth in the appended claims, reference being had to the accompanying drawing and to the characters of reference thereon which form a part of this application in which:

Figure 1 is a fragmentary side elevational view of an ornamental flower basket incorporating my invention in one form, the handle being shown fragmentarily; Fig. 2 is an enlarged perspective view of the essential elements of the handle securing means shown in Fig. 1, the handle being shown fragmentarily; and, Fig. 3 is a fragmentary perspective view of the basket showing a slightly modified form of construction of my handle securing means in connection therewith.

Like characters of reference refer to similar parts and portions throughout the views of the drawing.

The article shown in Fig. 1 is a type of flower basket in common use and consists essentially of a vase 1 which is surrounded and supported by reed basket work 2. To the upper portion of the reed basket work is connected the handle 3 which is usually in the form of a large loop. The handle is usually made of braided reed $3a$ reinforced by a relatively heavy wire $3b$ around which the reed is braided. My invention is applied to this form of basket so that the handle may be easily, quickly and positively secured to the lower portion or receptacle portion of the basket and so that the handle may be easily and quickly removed when desiring to store the basket or to ship the same from place to place.

The handle securing means shown in Figs. 1 and 2 comprises a pair of tubular members 4 and a pair of spring members 5, one of the spring members being provided for each tubular member. One of the tubular members is secured to each side of the receptacle portion of the basket, or, in this instance, to the reed work 2.

The member 4 may be made of sheet metal pressed in tubular form with its long edges spaced apart forming a long slot $4a$ at the one side and preferably the outermost side of the tubular member. This member is flattened at its lower end, the flattened portion being provided with an outwardly offset U-shaped portion $4b$. Immediately below the offset portion 4b is a downwardly extending portion 4c. The offset portion 4b together with the downwardly extending portion 4c serves to secure the tubular member to the basket. This tubular member is secured to the basket by extending the upper end thereof through the usual laterally extending flange portion 2a of the reed work 2, and by securing the lower end of the tubular member behind the portion of a circumscribing recess 2b of the reed work. The securing of the lower end of the tubular member to the reed work is facilitated by the outwardly offset portion 4b and the downwardly extending portion 4c. Such securing of the lower end of the tubular member to the reed work is accomplished as the basket is woven. In so securing the tubular member to the basket, the downwardly extending portion 4c is placed behind or under the lower reeds of the circumscribing reed portion 2b of the reed work 2, while the upper portion of the circumscribing reed work 2 extends into the outwardly offset portion 4b, as shown in Fig. 3. The tubular portion of the member 4 is provided intermediate its ends with an outwardly punched projection 4d adapted to be engaged by the spring member 5 for preventing the member 5 being forced downwardly when the handle is applied to the basket.

The member 5 is preferably made of a leaf spring having holes 5a at its opposite ends. These holes are adapted to be aligned by bending the spring member intermediate its ends. When so aligned the tubular member is inserted through the holes with the bowed portion of the member at the side of the tubular member opposite the slot therein. The normally upper end of the spring member 5 is provided with a lug 6b which extends into the upper hole and into the slot 4a of the tubular member. This lug 5b is directed downwardly in such a manner that when the end 3c of the handle is inserted into the tubular member from the upper end thereof, the lug 5b engages the portion 3c positively so as to prevent ready removal of the handle until the lug 5b is removed from the slot by bending the upper end of the spring member 5 downwardly. In order to facilitate the retention of the ends of the handle within the tubular member, the end portions 3c of the handle are provided at their outer sides with transverse notches 3d, which are adapted to receive the inner ends of the lugs 5b of the securing means at the opposite sides. Thus the handle is retained in position more positively.

In the modified structure shown in Fig. 3, the tubular member is eliminated and the spring member 5 is merely looped around the portion 2b of the reed work, or, if desired, the spring member 5 may be secured directly intermediate its ends to the vase 1 or other portion of the receptacle. In the latter instance, it is necessary to draw the ends of the spring member 5 outwardly and toward each other until the holes 5a are sufficiently aligned to permit the ends of the handle to be extended therethrough. With this construction, it will be observed, it is necessary to guide the end of the handle through the upper portion of the reed work of the basket and then to direct the handle separately through the separate holes in the spring member. In the modified form, the end portions 3c of the handle may also be provided with transverse notches 3d to facilitate the holding of the handle in position.

Though I have shown and described a particular construction, combination and arrangement of parts and portions, and certain modifications thereof, and have described and shown a specific application of my invention to a flower basket, I do not wish to be limited to this particular construction, combination and arrangement, nor to the particular modifications, or applications, but desire to include in the scope of my invention the construction, combination and arrangement substantially as set forth in the appended claims.

Having thus described my invention what I claim as new and desire to secure by Letters Patent is:

1. In a means of the class described, the combination with a receptacle and a handle, of a leaf spring secured with respect to the receptacle and provided at its opposite ends with holes adapted to be aligned when the spring is bowed for receiving the end of the handle.

2. In a means of the class described, the combination with a receptacle and a handle, of a leaf spring secured with respect to the receptacle and provided at its opposite ends with holes adapted to be aligned when the spring is bowed for receiving the end of the handle, the end of the handle being provided with longitudinally spaced apart notches adapted to receive portions of the spring forming the holes therein.

3. In a means of the class described, the combination with a receptacle and a handle, of a spring secured with respect to the receptacle and provided at its opposite ends with holes adapted to be aligned when the spring is bowed for receiving the end of the handle, the end of the handle being provided with longitudinally spaced apart notches adapted to receive portions of the spring forming the holes therein.

4. In a means of the class described, the combination with a receptacle and a handle, of a tubular member extending from the upper and side portion of the receptacle downwardly to the sides thereof, said tubular member being longitudinally slotted at its outer side, and a spring member mounted on the tubular member and provided with a lug extending through the slot, the end of the handle being insertable into the tubular member from the upper end thereof and adapted resiliently to be engaged by the lug.

5. In a means of the class described, the combination with a receptacle and a handle, of a tubular member extending from the upper and side portion of the receptacle downwardly to the sides thereof, said tubular member being longitudinally slotted at its outer side, and a spring member mounted on the tubular member and provided with a lug extending through the slot, the end of the handle being insertable into the tubular member from the upper end thereof, the portion of the handle entering the tube being provided with a plurality of longitudinally spaced apart notches adapted to receive the lug.

6. In a means of the class described, the combination with a receptacle and a handle, of a longitudinally slotted tubular member secured to the side of the receptacle from the upper end toward the side thereof, and a bowed spring member provided at its opposite ends with holes adapted to receive the tubular member, one end of the spring member having a lug extending into the hole at said end and adapted to extend into the longitudinal slot of the tubular member, the end of the handle being extendable into the tubular member and adapted to be engaged by said lug.

7. In a means of the class described, the combination with a receptacle and a handle, of a longitudinally slotted tubular member secured to the side of the receptacle from the upper end toward the side thereof, and a bowed spring member provided at its opposite ends with holes adapted to receive the tubular member, one end of the spring member having a lug extending into the hole at said end and adapted to extend into the longitudinal slot of the tubular member, the end of the handle being extendable into the tubular member and adapted to be engaged by said lug, said lug being normally directed into said slot and downwardly with respect thereto, said lug being removable from the slot by urging the ends of the spring member toward each other.

8. In a means of the class described, the combination with a receptacle and a handle, of a tubular member extending from the upper and side portion of the receptacle downwardly to the sides thereof, said tubular member being longitudinally slotted at its outer side, and a spring member mounted on the tubular member and provided with a lug extending through the slot, the end of the handle being insertable into the tubular member from the upper end thereof and adapted resiliently to be engaged by said lug, said lug being normally directed into said slot and downwardly with respect thereto.

9. In a means of the class described, the combination with a receptacle and a handle, of a tubular member secured to the side of the receptacle and extending downwardly from its upper end, a bowed spring member provided with openings at its opposite ends adapted to be aligned when the spring member is bowed for receiving the tubular member, one end of the spring member having a portion extending into the interior of the tubular member, the handle being extendable into the tubular member and adapted to be engaged by the portion of the spring member extending into the interior thereof.

10. In a means of the class described, the combination with a receptacle and a handle, of a longitudinally slotted tubular member secured to the side of the receptacle from the upper end toward the side thereof, said tubular member being provided intermediate its ends with an outwardly projecting lug, and a bowed spring member provided at its opposite ends with holes adapted to receive the tubular member and adapted to engage said outwardly projecting lug, one end of the spring member having a lug extending into the hole at said end and adapted to extend into the longitudinal slot of the tubular member, the end of the handle being extendable into the tubular member and adapted to be engaged by said lug.

In testimony whereof, I have hereunto set my hand at Los Angeles, California this 29th day of April 1931.

WALTER H. NASH.